(12) United States Patent
Guo

(10) Patent No.: US 9,232,453 B2
(45) Date of Patent: Jan. 5, 2016

(54) METHOD AND DEVICE FOR PROCESSING AT COMMAND WHEN MOBILE PHONE LOSES COVERAGE AND SWITCHES BETWEEN SYSTEMS

(71) Applicant: ZTE Corporation, Shenzhen, Guangdong (CN)

(72) Inventor: Feng Guo, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 14/408,759

(22) PCT Filed: Jul. 4, 2013

(86) PCT No.: PCT/CN2013/078777
§ 371 (c)(1),
(2) Date: Dec. 17, 2014

(87) PCT Pub. No.: WO2014/019439
PCT Pub. Date: Feb. 6, 2014

(65) Prior Publication Data
US 2015/0208307 A1   Jul. 23, 2015

(30) Foreign Application Priority Data

Aug. 2, 2012 (CN) .......................... 2012 1 0273308

(51) Int. Cl.
*H04W 36/14* (2009.01)
*H04L 29/08* (2006.01)
(Continued)

(52) U.S. Cl.
CPC ........... *H04W 36/14* (2013.01); *H04L 67/2861* (2013.01); *H04W 24/02* (2013.01); *H04W 36/02* (2013.01); *H04W 36/0022* (2013.01); *H04W 88/06* (2013.01)

(58) Field of Classification Search
CPC ..... H04W 36/14; H04W 24/02; H04W 88/06; H04W 72/1205; H04W 72/1273; H04W 72/048; H04W 8/10; G06F 1/26; H04L 63/0471; H04L 67/18; H04L 12/66

USPC ........... 455/551, 466, 552.1, 414.1; 340/438, 340/540; 370/401, 328, 331, 389
See application file for complete search history.

(56) References Cited

U.S. PATENT DOCUMENTS

| 2007/0173283 | A1  | 7/2007  | Livet    |               |
|--------------|-----|---------|----------|---------------|
| 2010/0291920 | A1* | 11/2010 | Lerzer   | H04L 12/2854  |
|              |     |         |          | 455/426.1     |
| 2013/0322403 | A1* | 12/2013 | Diachina | H04W 72/1273  |
|              |     |         |          | 370/331       |

FOREIGN PATENT DOCUMENTS

CN           101068404 A    11/2007
(Continued)

OTHER PUBLICATIONS

International Search Report in international application No. PCT/CN2013/078777, mailed on Oct. 10, 2013.
(Continued)

*Primary Examiner* — Phuoc H Doan
(74) *Attorney, Agent, or Firm* — Oppedahl Patent Law Firm LLC

(57) ABSTRACT

Method and device for processing an AT command when a mobile phone loses coverage or is performing mode switching. If the mobile phone camps on a first mode after being powered on, a protocol stack sets current and backup modes as the first mode; after the mobile phone loses coverage, if there is an AT command to be issued, an ATI module acquires the backup mode and issues the AT command to NAS of the backup mode for processing; and when the mobile phone switches from the first mode to a second mode, after modifying the current and backup modes to the second mode, an general control module notifies the NAS of the first mode to perform a switching operation, when there is an AT command to be issued, the ATI module delivers the AT command to an NAS of the second mode for caching and processing after the switching.

15 Claims, 7 Drawing Sheets

---

If the mobile phone camps on a first mode after being powered on, a protocol stack records a current mode and a backup mode as the first mode

↓

After the mobile phone loses coverage due to the signal strength becomes poor or the signal disappears, if there is an AT command to be issued, an ATI module issues the AT command to an NAS of the first mode corresponding to the backup mode so as to be processed therein by acquiring the backup mode

↓

When the mobile phone switches from the first mode to a second mode, after modifying the current mode and the backup mode to the second mode, an general control module notifies the NAS of the first mode to perform a switching operation, when there is an AT command to be issued, the ATI module hands over the AT command to an NAS of the second mode for caching, and the NAS of the second mode processes a cached AT command after the switching operation ends

(51) Int. Cl.
*H04W 36/02* (2009.01)
*H04W 24/02* (2009.01)
*H04W 36/00* (2009.01)
*H04W 88/06* (2009.01)

(56) References Cited

FOREIGN PATENT DOCUMENTS

| CN | 101175325 A | 5/2008 |
|---|---|---|
| CN | 101287208 A | 10/2008 |
| EP | 2063682 A1 | 5/2009 |

OTHER PUBLICATIONS

English Translation of the Written Opinion of the International Search Authority in international application No. PCT/CN2013/078777, mailed on Oct. 10, 2013.

Supplementary European Search Report in European application No. 13825857.9, mailed on Jul. 1, 2015.

* cited by examiner

METHOD AND DEVICE FOR PROCESSING AT COMMAND WHEN MOBILE PHONE LOSES COVERAGE AND SWITCHES BETWEEN SYSTEMS

TECHNICAL FIELD

The disclosure relates to the technical field of mobile communications, and in particular to a method and device for processing an AT command when a multi-mode mobile phone, supporting networks including Long Term Evolution (LTE), Time Division (TD) and Global System for Mobile (GSM), loses coverage due to poor signal strength or when performing mode switching.

BACKGROUND

Compared with 3G technology, LTE uses a totally new network architecture which reduces the number of network elements, decreases the complexity of signalling processes, uses Internet protocol (IP) based bottom layer design and supports Packet Switched (PS) domain, thus improving the response rate of a control plane and enabling a great improvement in the rate of a data plane with a rate of 50 M/S for an uplink data plane and a rate of 100 M/S for a downlink data plane.

With the increasing development of LTE technology, the acceleration of the commercial process and the gradual promotion and application over the world, LTE networks are widely accepted by the industry due to its higher utilization of the spectrum and higher data rates.

China Mobile already starts construction of commercial LTE networks, but the construction cannot be built at one stroke, at the beginning LTE networks cannot cover all areas, thus in areas without LTE network coverage, GSM networks or TD-S networks are desired to provide services, and therefore at present it is imperative to implement integration of GSM/TD/LTE networks. Accordingly, a mobile phone needs to support multiple network modes.

For a multi-mode mobile phone, it is desired to acquire firstly a current mode where it camps before an AT command is issued, then the AT command is transmitted to a module of a corresponding mode. As shown in FIG. 1, an AT command is a general approach through which an upper layer application interacts with a bottom layer protocol stack, and has a fixed format. When the upper layer application initiates a service, it notifies the protocol stack of a message by way of an AT command, the message is processed by the protocol stack after being parsed, and a result of the processing is reported to the upper layer application by way of an AT command response. In this way, the execution of the AT command is completed. There is a parsing module for the AT command, referred to as an AT Interpreter (ATI) module, between the upper layer application and the bottom layer protocol stack.

FIG. 1 is a schematic flow chart showing the operation of an AT command in the prior art. The AT command operates by way of "question and answer" mode, i.e., after one AT command is transmitted to a protocol stack, the protocol stack needs to transmit a response to the ATI according to a result of the processing after completing processing so as to report the result of the processing. Before the protocol stack returns the result of the processing (AT response), the AT command cannot be issued once again and a issued AT command will be denied.

The AT command is transmitted in a format specified by a protocol, but the protocol stack cannot identify the format, so the ATI is desired to decode it, parse valid information elements thereof and perform a preliminary validity determination so as to construct a corresponding message to be transmitted to the protocol stack; a result reported by the protocol stack is formed into a format of the AT response so as to be reported to the upper layer application.

AT commands implement four operations:
1. an action command for performing an action, e.g., starting to selecting a network or activating a bearer;
2. a setting command for setting several parameters, e.g., defining bearer context or setting QoS;
3. a query command for querying several parameters, e.g., querying attachment status or bearing TFT; and
4. a testing command for querying a value range of a parameter, e.g., querying a value range of QoS.

Among above operations, only the action command needs to perform process interaction with a network side while other commands can be completed independently at the mobile phone side.

FIG. 2 shows a processing process in the case that an existing mobile phone loses coverage after attachment, as shown in FIG. 2, when the mobile phone normally attaches to a network after being powered on, the protocol stack will record the currently-attached network. After an AT command is issued, an ATI transmits the AT command to a Non-Access Stratum (NAS) module of the corresponding mode according to the current mode which the protocol stack maintains. If coverage losing occurs, the protocol stack empties the current mode and sets the current mode to be invalid. The mobile phone starts a timer, searches periodically for an appropriate cell and attempts to camp on a cell. Once the mobile phone camps successfully on the cell, a current mode is recorded. If the current mode is the same as a mode used before the coverage is lost, there will be no special process; otherwise, if the current mode is different from the previous mode, a re-selection will be initiated and the protocol stack will switch to the new mode.

FIG. 3 shows a schematic processing process of an existing mobile phone during mode switching. Taking a switching from LTE to TD as shown in FIG. 3 as an example, after the mobile phone implements attachment to a LTE network, the signal strength of the LTE network becomes poor, the mobile phone finds a cell of a TD network, successfully resides therein and determines to perform handover, then a general control module will notify a data plane to stop data transmission (if there is data being transmitted), set the current mode as TD and notify a NAS of the LTE to start handover. Then, the NAS stops ongoing processes (if any), and transfers in sequence control information to a NAS of the TD. After the transfer of control information completes, the data plane is notified to deliver data not yet transmitted through the LTE to the TD for transmission, and the TD re-starts processes not yet completed in the LTE.

Generally, after a multi-mode mobile phone is powered on and camps on a certain mode, a protocol stack records whether a currently camped mode is LTE or TD/GSM (abbreviated as TG), and modules receiving AT commands in the protocol stack are all in a NAS. Before an ATI issues one AT command, it may query the currently-camped mode and send the AT command to a NAS of the mode. Under normal circumstances, this processing method is reasonable.

Two abnormal scenarios are considered below.

First, after a mobile phone is normally powered on and camps on a certain mode, it loses coverage.

As shown in FIG. 2, taking the case that the mobile phone camps on LTE after being powered on as an example, when the signal strength becomes poor, coverage losing occurs and the mobile phone cannot find any cells, then a current mode may be emptied (i.e., not being able to camp on any mode). A new mode cannot be recorded until an appropriate cell is found.

In this case, after the mobile phone is powered on, each time the ATI transmits an AT command it may find that the current mode is LTE, and thus the AT command is transmitted to a NAS of the LTE. After the coverage losing occurs, when an AT command is further transmitted, the ATI may not find valid modes, then the case that the AT command cannot be delivered may arise.

Second, the AS already changes the mode but the NAS is still during switching.

As shown in FIG. 3, the case that the mobile phone camps on LTE after being powered on is still taken as an example. When a signal changes, the signal of LTE becomes poor while the signal of TD becomes strong, the AS starts switching after measuring the signal, modifies the current mode as TD and notifies the NAS to perform switching of the control plane. The NAS of the LTE ceases ongoing processes, starts performing switching and transfers various control information to a TD module. After the transfer of control information and data completes, services will be resumed in the TD. If there is an AT command desired to be issued during the transfer and the ATI finds that the current mode is TD, the AT command is transmitted to the NAS of TD, but at this moment data of the control plane is not yet or being transmitted to the TD, while subsequent processes cannot be triggered in the case that the control information is not yet completely available, that is to say, though the NAS of the TD receives the AT command at that moment but the AT command cannot be executed.

SUMMARY

In view of the above, an embodiment of the disclosure provides a method for processing an AT command when a multi-mode mobile phone loses coverage due to poor signal strength or when the mobile phone is performing mode switching.

According to another aspect, an embodiment of the disclosure provides a device for implementing above method.

Embodiments of the disclosure aim to determine an AT command should be transmitted to a module corresponding to which mode in the case that an access stratum cannot camp on a specific mode due to that a mobile phone loses coverage in a certain mode or in the case that the mode of an access stratum is different from that of non-access stratum when a mobile phone is performing mode switching and the switching is not yet completed.

According to a first aspect of embodiments of the disclosure, provided is a method for processing an AT command when a multi-mode mobile phone loses coverage or is performing mode switching, and the method includes:

if the mobile phone camps on a first mode after being powered on, the protocol stack sets a current mode and a backup mode as the first mode;

after the mobile phone loses coverage, if there is an AT command to be issued, by an AT Interpreter (ATI) module, acquiring the backup mode, and issuing the AT command to a Non-Access Stratum (NAS) of the first mode corresponding to the backup mode for processing;

when the mobile phone switches from the first mode to a second mode, general control module modifies the current mode and the backup mode to the second mode, and then notifies the NAS of the first mode to perform a switching operation, when there is an AT command to be issued, handing over, by the ATI module, the AT command to the NAS of the second mode for caching, and processing, by the NAS of the second mode, a cached AT command after the switching operation ends.

In an embodiment, the issuing the AT command to a NAS of the first mode corresponding to the backup mode for processing may include: if the AT command is an action command, caching, by the NAS of the first mode, the AT command.

In an embodiment, after a signal of the mobile phone is restored and the mobile phone once again camps on the first mode through searching cells, the current mode and the backup mode may be updated as the first mode, and the NAS of the first mode may process a cached AT command.

In an embodiment, the issuing the AT command to a NAS of the first mode corresponding to the backup mode for processing may further include: if the AT command is a setting command or a query command, the NAS of the first mode processes the AT command accordingly.

In an embodiment, when the mobile phone switches from the first mode to the second mode, if there is an ongoing data service, the AS of the first mode may stop data transmission.

In an embodiment, when the mobile phone switches from the first mode to the second mode, the AS of the first mode may notify the general control module to modify the current mode and the backup mode to the second mode.

In an embodiment, the performing a switching operation by the NAS of the first mode, may include: various control information of the NAS of the first mode is transferred into the NAS of the second mode.

Preferably, the ATI module may deliver the AT command to the NAS of the second mode for caching when finding that the current mode is the second mode.

In an embodiment, the first mode may be LTE while the second mode may be TD or GSM; or the first mode may be TD or GSM while the second mode may be LTE.

According to a second aspect of embodiments of the disclosure, provided is a device for processing an AT command when a multi-mode mobile phone loses coverage or when the mobile phone is performing mode switching, and the device includes:

a protocol stack is configured to record a current mode and a backup mode as a first mode which the mobile phone camps on after being powered on;

an AT Interpreter (ATI) module is configured to parse the AT command, and acquire, if there is an AT command to be issued after the mobile phone loses coverage due to that a signal strength becomes poor or the signal disappears, the backup mode, and send the AT command to a Non-Access Stratum (NAS) of the first mode corresponding to the backup mode for processing; and a general control module is configured to, when the mobile phone switches from the first mode to a second mode, modify the current mode and the backup mode to the second mode, notify the NAS of the first mode to perform a switching operation, when there is an AT command to be issued at this time, notify the ATI module to deliver the AT command to the NAS of the second mode for caching, and notify the NAS of the second mode to process a cached AT command after the switching operation ends.

In an embodiment, in the case that the ATI module issues the AT command to the NAS of the first mode corresponding to the backup mode for processing, if the AT command is an action command, the NAS of the first mode caches the AT command;

In an embodiment, the general control module is further configured to, in the case that the mobile phone once again camps on the first mode through searching cells when a signal of the mobile phone is restored, update the current mode and the backup mode as the first mode, and the NAS of the first mode processes the cached AT command.

In an embodiment, the ATI module may be further configured to, when issuing the AT command to an NAS of the first mode corresponding to the backup mode for processing, if the AT command is a setting command and a query command, the NAS of the first mode processes the AT command accordingly.

In an embodiment of the disclosure, the general control module is further configured to notify the AS of the first mode to stop data transmission when the mobile phone switches from the first mode to the second mode and there is an ongoing data service.

In an embodiment, the general control module is further configured to modify the current mode and the backup mode to the second mode based on a notice from the AS of the first mode, when the mobile phone switches from the first mode to the second mode.

In an embodiment, the general control module is further configured to transfer various control information of the NAS of the first mode into the NAS of the second mode when the NAS of the first mode performs a switching operation.

In an embodiment, the ATI module may be further configured to deliver the AT command to the NAS of the second mode for caching when finding that the current mode is the second mode.

Compared to the prior art, embodiments of the disclosure solve simply and efficiently the above problems of processing AT issuing in two scenarios with a backup mode and a caching mechanism so that a multi-mode mobile phone can efficiently process an AT command when the mobile phone loses coverage due to poor signal strength or when the mobile phone is performing mode switching.

DETAILED DESCRIPTION

In order to make the disclosure more clear, the disclosure will be further elaborated below.

Figure 1:
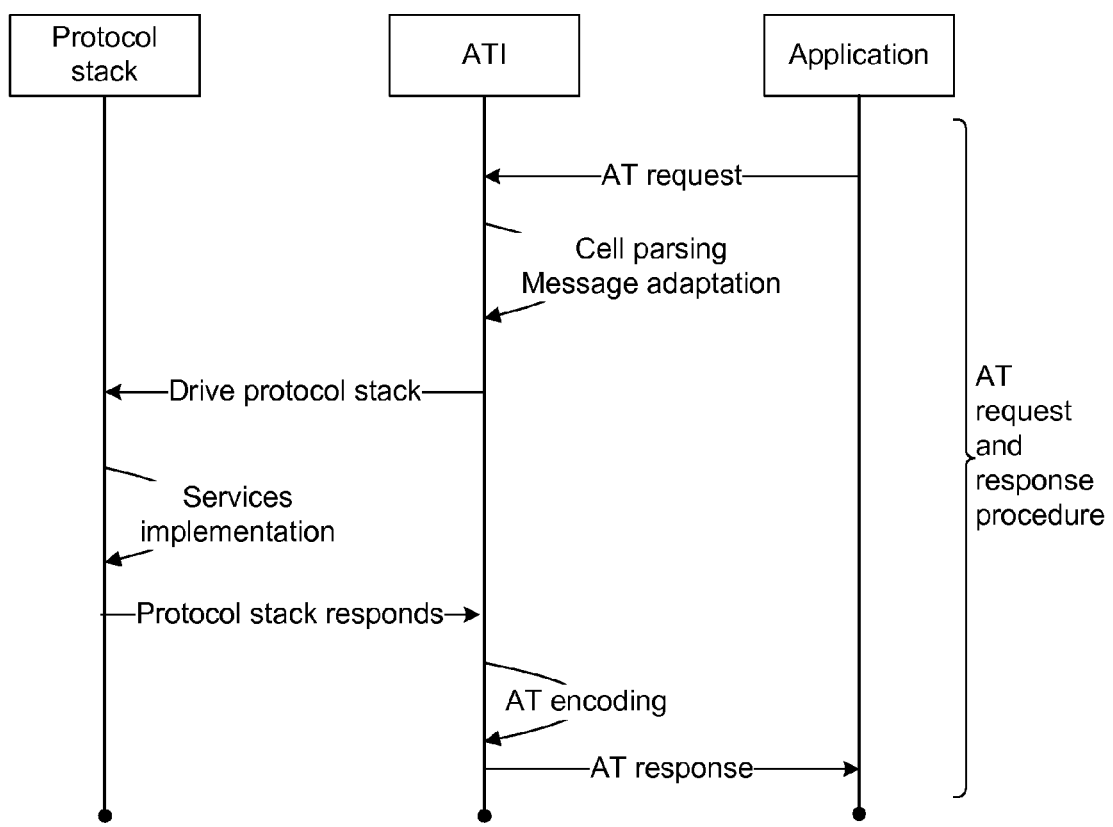
FIG. 1 is a schematic flow chart, of an AT command in the prior art, showing a whole processing process of the AT command in a mobile phone.
Figure 2:
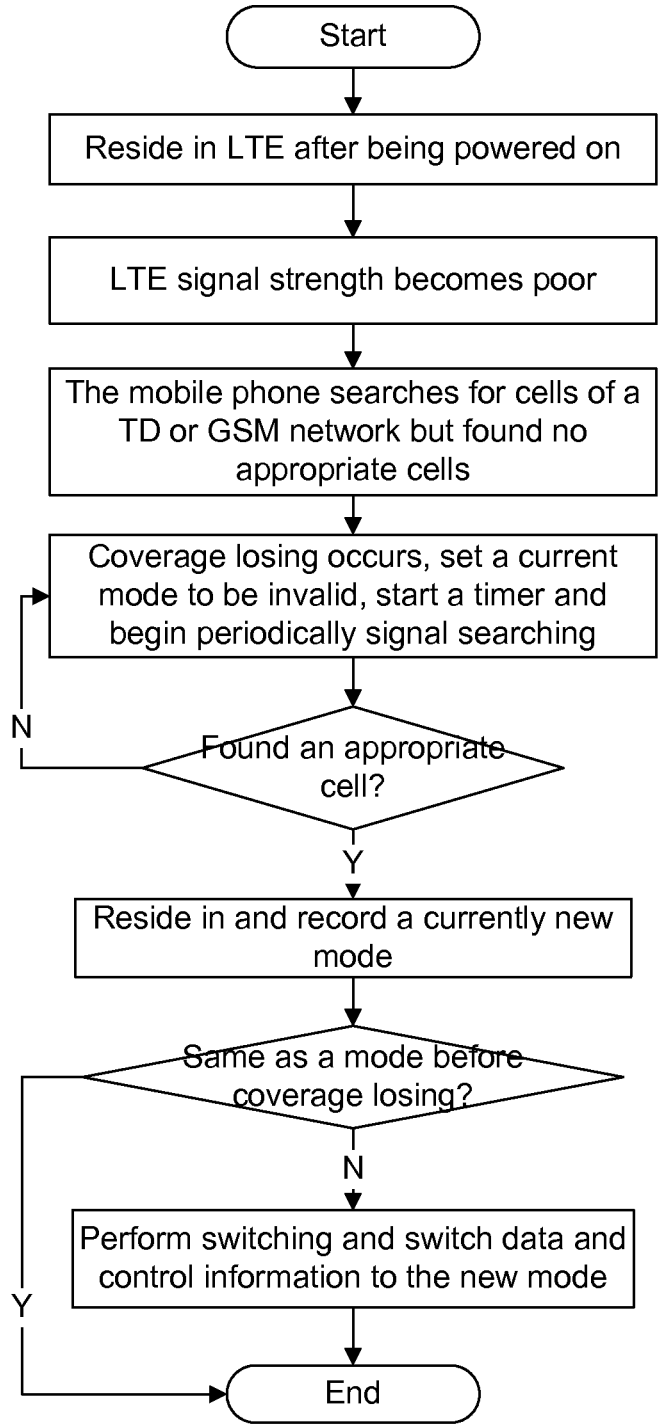
FIG. 2 is a schematic processing process, in the case that an existing mobile phone loses coverage after camping on a network, showing a process of searching for networks and cells by the mobile phone after losing coverage.
Figure 3:
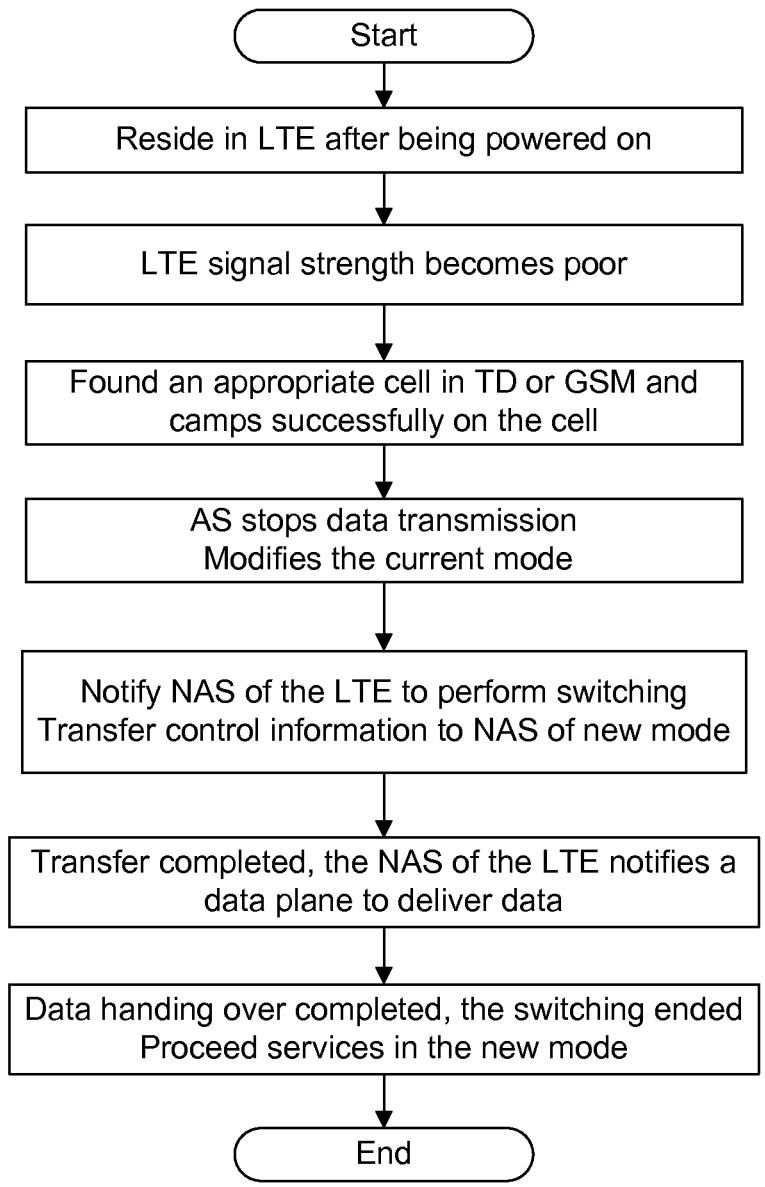
FIG. 3 is a schematic processing process, of an existing mobile phone during switching, showing whole processes of an AS and a NAS when the mobile phone is performing mode switching.
Figure 4:
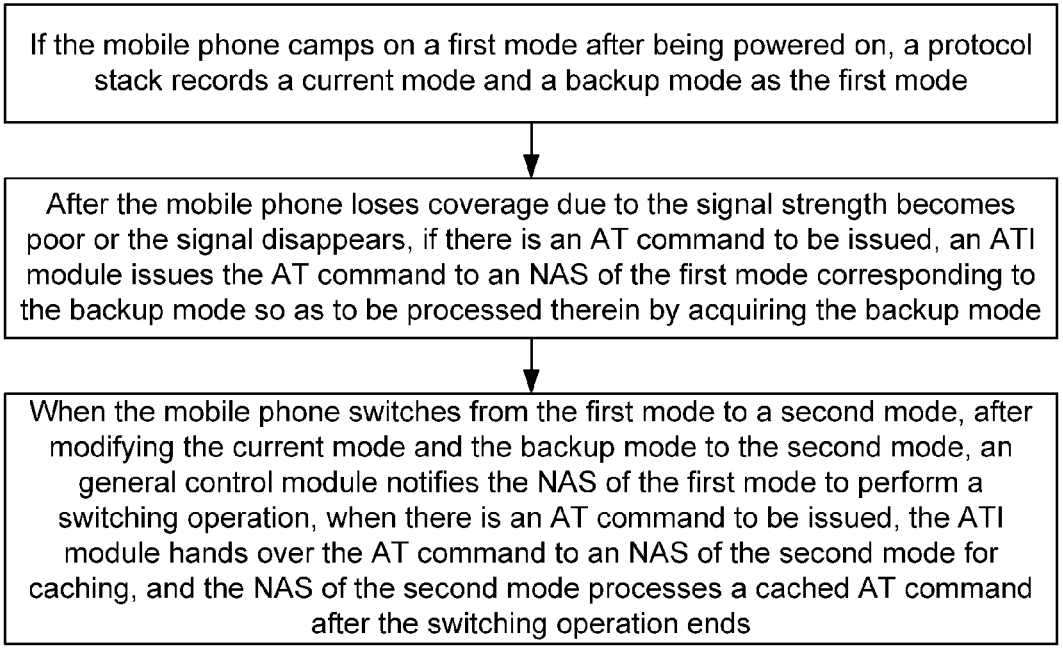
FIG. 4 is a schematic flow chart showing a method for processing an AT command when a mobile phone loses coverage and is performing mode switching according to an embodiment of the disclosure.

FIG. 4 shows a method for processing an AT command when a multi-mode mobile phone loses coverage or when the mobile phone is performing mode switching according to an embodiment of the disclosure, as shown in FIG. 4, the method includes the following steps:

A) if the mobile phone camps on a first mode after being powered on, a protocol stack sets a current mode and a backup mode as the first mode;

B) after the mobile phone loses coverage due to the signal strength becomes poor or the signal disappears, if there is an AT command to be issued, an AT Interpreter (ATI) module acquires the backup mode and sends the AT command to a Non-Access Stratum (NAS) of the first mode corresponding to the backup mode for processing; and C) when the mobile phone switches from the first mode to a second mode, general control module modifies the current mode and the backup mode to the second mode, and then notifies the NAS of the first mode to perform a switching operation; when there is an AT command to be issued, the ATI module delivers the AT command to the NAS of the second mode for caching, and the NAS of the second mode processes a cached AT command after the switching operation ends.

In step B), if the AT command is an action command, the NAS module of the first mode caches the AT command.

In an embodiment, after a signal of the mobile phone is restored and the mobile phone once again camps on the first mode through searching cells, in the embodiment of the disclosure the current mode and the backup mode may be updated as the first mode, and the NAS of the first mode may process a cached AT command.

In addition, in the above step B), if the AT command is a setting command or a query command, the NAS of the first mode processes the AT command accordingly.

In addition, in the above step C), when the mobile phone switches from the first mode to the second mode, if there is an ongoing data service, an AS of the first mode may stop data transmission.

On the other hand, in the above step C), when the mobile phone switches from the first mode to the second mode, the AS of the first mode may notify the general control module to modify the current mode and the backup mode to the second mode.

In addition, in the above step C), the performing a switching operation by the NAS of the first mode, may include: various control information of the NAS of the first mode is transferred into the NAS of the second mode.

In the above method according to the embodiment of the disclosure, an ATI module configured to parse AT commands (i.e., an AT parsing module) may deliver the AT command to the NAS of the second mode for caching when finding that the current mode is the second mode.

In the embodiment of the disclosure, the first mode may be LTE while the second mode may be TD or GSM; or the first mode may be TD or GSM while the second mode may be LTE.

Figure 5:
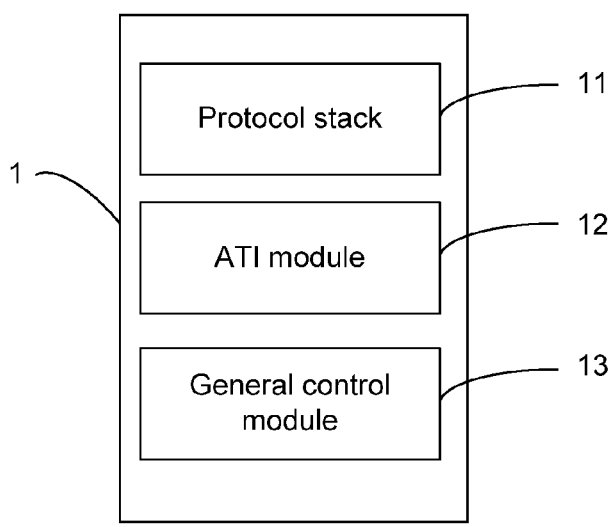
FIG. 5 is a schematic diagram showing a device for processing an AT command when a mobile phone loses coverage and is performing mode switching according to an embodiment of the disclosure.

FIG. 5 is a schematic diagram showing a device for processing an AT command when a multi-mode mobile phone loses coverage and is performing mode switching according to an embodiment of the disclosure, as shown in FIG. 5, the device includes:

a protocol stack is configured to record a current mode and a backup mode as the first mode after the mobile phone is powered on and camps on the first mode;

an AT Interpreter (ATI) module is configured to parse the AT command and after the mobile phone loses coverage due to that a signal strength becomes poor or the signal disappears, if there is an AT command to be issued, acquire the backup mode and issue the AT command to a Non-Access Stratum (NAS) of the first mode corresponding to the backup mode for processing; and a general control module is configured to, when the mobile phone switches from the first mode to a second mode, modify the current mode and the backup mode to the second mode, notify the NAS of the first mode to perform a switching operation, when there is an AT command to be issued, notify the ATI module to deliver the AT command to a NAS of the second mode for caching, and notify the NAS of the second mode to process a cached AT command after the switching operation ends.

The process of processing an AT command according to embodiments of the disclosure will be elaborated below with reference to FIG. 6 to FIG. 8.

Embodiments of the disclosure aim to determine an AT command should be transmitted to a module corresponding to which mode, in the case that an access stratum cannot camp on a specific mode due to that a mobile phone loses coverage in a certain mode or in the case that the mode of an access stratum is different from that of non-access stratums when a mobile phone is performing mode switching and the switching is not yet completed.

Embodiments of the disclosure can ensure effectively, in above two cases, the ATI can still issue an AT command to the protocol stack and the protocol stack can perform appropriate processing so as to return a processing result to the ATI. It involves separate storage of a previous mode and caching of the AT command in the protocol stack, the storage of the previous mode may ensure that when a coverage is lost the ATI can trace back to the previous mode and issue an AT command according to the previous mode; in the above two cases, the caching of an AT command by the protocol stack may ensure that after the signal is restored and switching is completed, the protocol stack can complete processing of a previously-transmitted AT command and then normally end the AT command process.

The following discussion is made in terms of the case that coverage losing occurs in LTE.

In order to deal with AT command issuing in a scenario of losing coverage, not only a current camped mode is recorded but also a backup mode needs to be recorded (in normal circumstances, the current mode and the backup mode are same, when coverage is lost, the current mode is set to be invalid and the backup mode remains unchanged). After the mobile phone is powered on and camps on LTE, the protocol stack records the current mode as LTE and sets the backup mode also as LTE. When issuing an AT command, the ATI may query the current mode and transmit the AT command to a NAS of the LTE. After coverage is lost, when there is an AT command to be issued and the ATI cannot find the current mode, then the ATI may acquire a backup mode and find that the backup mode is LTE, thus it still issues the AT command to the NAS module of the LTE. For AT commands of a setting and query type, the NAS of the LTE processes accordingly and returns a result to the ATI; for AT commands of an action type, since losing coverage, the NAS cannot interact with a core network and the process cannot be initiated, then the AT commands are cached.

After the signal is restored, the mobile phone begins to search cells and resides therein. If the mobile phone camps on LTE once again, the current mode and the backup mode are updated as LTE; after knowing that the signal is restored, the NAS of the LTE begins to process previously-cached AT commands. If the mobile phone camps on a TD or GSM (taking TD as an example), the LTE may receive a switching notice, the cached AT commands then cannot be processed in the LTE mode, the NAS transmits to the ATI an error code carrying cause of error and notifies the ATI to re-transmit the AT command. Since the current mode is TD, the ATI re-transmits the AT command to a NAS of the TD.

When the mobile phone attaches to a LTE network after being powered on, if quality of the cell changes, and it is desired to switch to a TD or GSM network (taking TD as an example), an AS of the LTE may stop data transmission (if there are ongoing data services), notify a general control module of the mobile phone to set the current mode and the backup mode as TD, then the general control module notifies the NAS of the LTE to start switching so as to transfer control information. At that moment, if there is an AT command to be issued and when finding that the current mode is TD, the ATI will issue the AT command to a NAS module of the TD. But since it is during the switching and the transfer of the control information of the NAS needs to be performed in accordance with certain processes, control information in the NAS of the TD may not always be complete. In the case that the control information is missing or incomplete, neither a process for implementing an AT command of an action type can be initiated, nor a process for implementing an AT command of a setting or query type. Then the NAS of the TD caches AT commands. After the switching of NAS ends, cached AT commands are processed.

Figure 6:
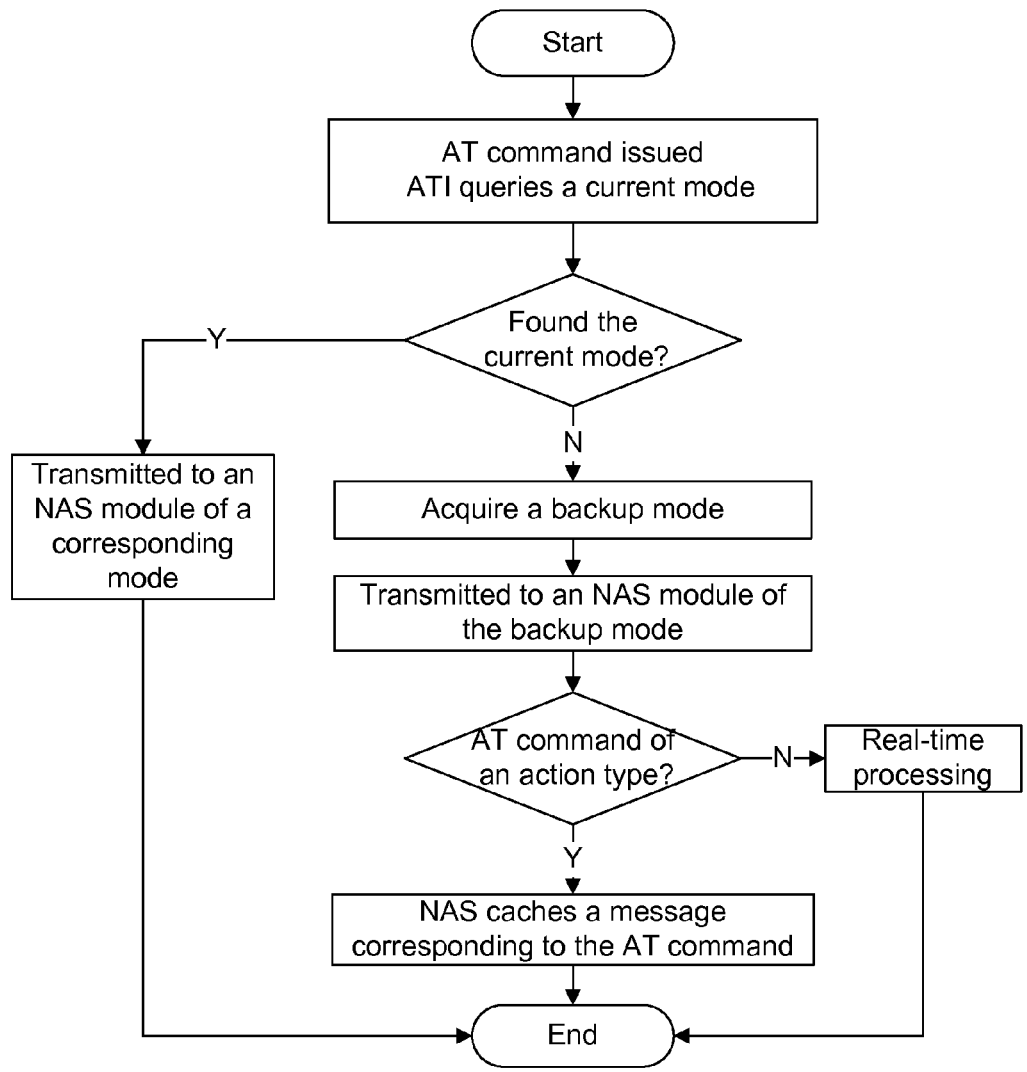
FIG. 6 is a schematic processing process beginning with issuing an AT command according to an embodiment of the disclosure, including a normal process and a process when a coverage is lost.

FIG. 6 shows a processing process of an issued AT command in a protocol stack before and after losing coverage. As described above, before coverage is lost, the protocol stack records a currently-camped mode into a "current mode" and a "backup mode". When an AT command is issued, an ATI module may firstly query the current mode, if the current mode is valid, it means that coverage losing does not occur, the ATI transmits the AT command to a NAS module of a corresponding mode and waits for a response. If the current mode is invalid, it means that the coverage losing occurs, the ATI then query the backup mode where a mode on which the mobile phone camps before losing coverage is recorded. The ATI transmits the AT command to a NAS module of the backup mode. As described above, AT commands of a setting, query and testing type can be completed within the protocol stack without the interaction with a core network. Thus the protocol stack can process them normally and return a result to the ATI even though coverage is lost; in contrast, for an action command, since it is desired to interact with the core network, it cannot be initiated in the case that coverage is lost, and can only be cached until signal restoration.

Figure 7:
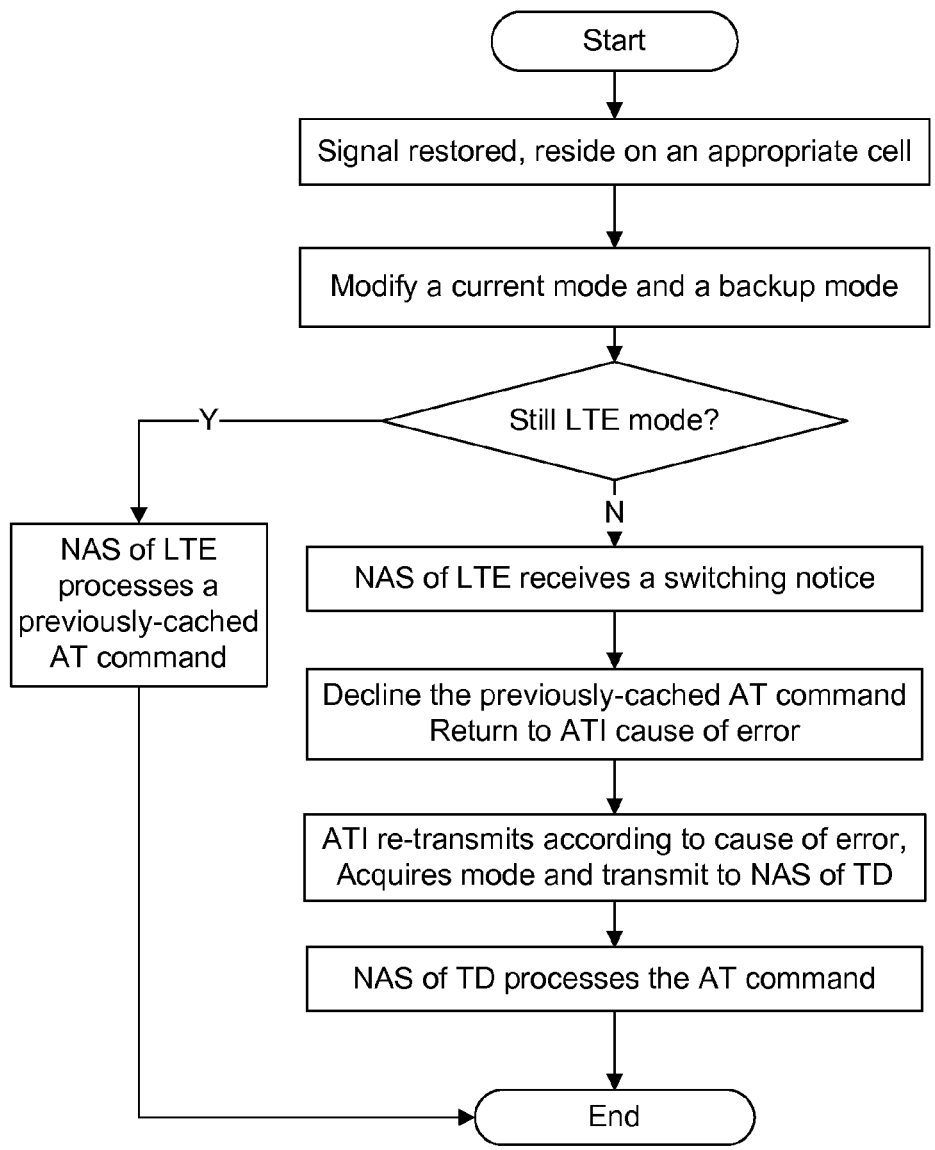
FIG. 7 is a schematic processing process of an AT command when a signal is restored according to an embodiment of the disclosure, including mainly the determination operations for different AT commands according to newly-camped mode.

FIG. 7 shows a way of processing a previously-cached AT command by a protocol stack after the signal is restored and the mobile phone camps on a network once again. After the signal is restored and an appropriate cell is found and camped on, a general control module may firstly modify the written current mode and backup mode. If the current mode is the same as a mode before coverage losing, a NAS may process the previously-cached AT command and return a processing result to an ATI. Otherwise, if modes are different, the NAS may receive a switching notice notifying the NAS to transfer control information to a NAS of a target mode. At that moment, due to change of the mode, the NAS cannot process the previously-cached AT command, and it returns to the ATI a result indicating cause of error, then the ATI re-transmits the AT command. The ATI queries the current mode and transmits the AT command to a new mode for processing therein.

Figure 8:
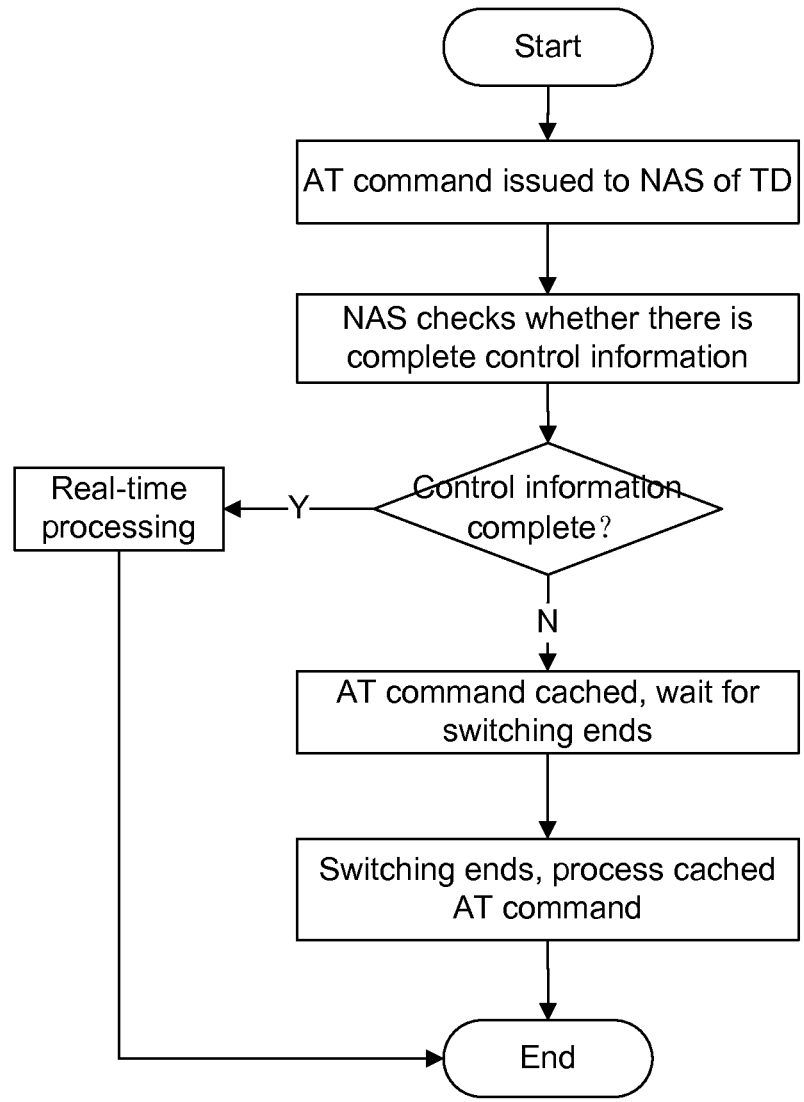
FIG. 8 is a schematic flow chart of processing an AT command during switching according to an embodiment of the disclosure, including processing approaches in two cases when control information is complete and incomplete.

FIG. 8 is a method for processing an AT command after being issued during switching. Taking switching from LTE to TD as an example, if switching occurs, since bottom layer physical signals change, services cannot proceed, an general control module may stop ongoing data service (if any) at the first place and modify a current mode and a backup mode as a TD mode. Then a NAS of the LTE is notified to start switching and transfer control information into a NAS of the TD. The NAS of the LTE starts transferring in sequence the control information. When there is an AT command to be issued at this moment, an ATI finds that the current mode is TD and transmits the AT command to the NAS of the TD, but the NAS of the TD finds that it is in the process of switching and there is no complete control information, then the NAS of the TD caches the AT command, and will process the cached AT command after the switching ends.

Although the disclosure is elaborated herein, the disclosure is not limited to the above description, and those skilled in the art can make various modifications according to the principle of the disclosure. Therefore, it will be appreciated that modifications made in accordance with the principle of the disclosure should fall within the scope of protection of the disclosure.

INDUSTRIAL APPLICABILITY

Embodiments of the disclosure solve simply and efficiently the above problems of processing AT issuing in two scenarios through one backup mode and a caching mechanism, and the embodiments of the disclosure enable a multi-mode mobile phone to efficiently process an AT command whenever the mobile phone loses coverage due to poor signal strength or mode switching.

The invention claimed is:

1. A method for processing AT commands when a mobile phone loses coverage or is performing mode switching, comprising:
   if the mobile phone camps on a first mode after being powered on, setting, by a protocol stack, a current mode and a backup mode as the first mode;
   after the mobile phone loses coverage, if there is an AT command to be issued, by an AT Interpreter (ATI) module, acquiring the backup mode, and sending the AT command to a Non-Access Stratum (NAS) of the first mode corresponding to the backup mode for processing;
   when the mobile phone switches from the first mode to a second mode, modifying, by a general control module, the current mode and the backup mode to the second mode and then notifying the NAS of the first mode to perform a switching operation, when there is an AT command to be issued, delivering, by the ATI module, the AT command to the NAS of the second mode for caching, and processing, by the NAS of the second mode, a cached AT command after the switching operation ends.

2. The method according to claim 1, wherein the issuing the AT command to an NAS of the first mode corresponding to the backup mode for processing comprises: if the AT command is an action command, caching, by the NAS of the first mode, the AT command.

3. The method according to claim 2, further comprising: when a signal of the mobile phone is restored, and the mobile phone once again camps on the first mode through searching cells, updating the current mode and the backup mode as the first mode, and processing, by the NAS of the first mode, the cached AT command.

4. The method according to claim 1, wherein the issuing the AT command to a NAS of the first mode corresponding to the backup mode for processing comprises: if the AT command is a setting command or a query command, processing accordingly, by the NAS of the first mode, the AT command.

5. The method according to claim 1, wherein when the mobile phone switches from the first mode to the second mode, if there is an ongoing data service, stopping, by an AS of the first mode, data transmission.

6. The method according to claim 1, wherein when the mobile phone switches from the first mode to the second mode, notifying, by the AS of the first mode, the general control module to modify the current mode and the backup mode to the second mode.

7. The method according to claim 6, wherein the performing a switching operation by the NAS of the first mode, comprises: transferring various control information of the NAS of the first mode into the NAS of the second mode.

8. The method according to claim 7, wherein the ATI module delivers the AT command to the NAS of the second mode for caching when finding that the current mode is the second mode.

9. The method according to claim 1, wherein the first mode is Long Time Evolution (LTE) while the second mode is Time Division (TD) or Global System for Mobile Communications (GSM); or the first mode is TD or GSM while the second mode is LTE.

10. A device for processing an AT command when a mobile phone loses coverage or when the mobile phone is performing mode switching, comprising:
   a protocol stack, configured to record a current mode and a backup mode as a first mode which the mobile phone camps on after being powered on;
   an AT Interpreter (ATI) module, configured to parse the AT command, and acquire, if there is an AT command to be issued after the mobile phone loses coverage, the backup mode, and send the AT command to a Non-Access Stratum (NAS) of the first mode corresponding to the backup mode for processing; and
   a general control module, configured to, when the mobile phone switches from the first mode to a second mode, modify the current mode and the backup mode to the second mode, notify the NAS of the first mode to perform a switching operation, when there is an AT command to be issued at this time, notify the ATI module to deliver the AT command to a NAS of the second mode for caching, and notify the NAS of the second mode to process a cached AT command after the switching operation ends.

11. The device according to claim 10, wherein in the case that the ATI module issues the AT command to a NAS of the first mode corresponding to the backup mode for processing, if the AT command is an action command, the NAS of the first mode caches the AT command;
   wherein the general control module is further configured to, in the case that the mobile phone once again camps on the first mode through searching cells when a signal of the mobile phone is restored, update the current mode and the backup mode as the first mode, and the NAS of the first mode processes the cached AT command.

12. The device according to claim 10, wherein the ATI module is further configured to, when issuing the AT command to an NAS of the first mode corresponding to the backup mode for processing, if the AT command is a setting command or a query command, the NAS of the first mode processes the AT command accordingly; and wherein the general control module is further configured to notify the AS of the first mode to stop data transmission when the mobile phone switches from the first mode to the second mode and there is an ongoing data service.

13. The device according to claim 10, wherein the general control module is further configured to modify the current mode and the backup mode to the second mode based on a notice from the AS of the first mode, when the mobile phone switches from the first mode to the second mode.

14. The device according to claim 13, wherein the general control module is further configured to transfer various control information of the NAS of the first mode into the NAS of the second mode when the NAS of the first mode performs a switching operation.

15. The device according to claim 14, wherein the ATI module is further configured to deliver the AT command to the NAS of the second mode for caching when finding that the current mode is the second mode.

\* \* \* \* \*